ized, 2, 428/35.2; 428/35.5;
United States Patent
Oswald

(10) Patent No.: US 6,258,424 B1
(45) Date of Patent: Jul. 10, 2001

(54) PACKAGING AND PROCESS FOR ITS PRODUCTION

(76) Inventor: Wolfgang Oswald, Heimatweg 7, A-9241 Wernberg (AT)

(*) Notice: Subject to any disclaimer, the term of this patent is extended or adjusted under 35 U.S.C. 154(b) by 0 days.

(21) Appl. No.: 09/202,320

(22) PCT Filed: May 14, 1998

(86) PCT No.: PCT/AT98/00128

§ 371 Date: Dec. 11, 1998

§ 102(e) Date: Dec. 11, 1998

(87) PCT Pub. No.: WO98/51585

PCT Pub. Date: Nov. 19, 1998

(30) Foreign Application Priority Data

May 14, 1997 (AT) ........................................................ 826/97

(51) Int. Cl.[7] .............................. B65D 81/03; B65D 81/05
(52) U.S. Cl. ...................... 428/36.9; 428/35.2; 428/35.5; 428/192; 383/3; 206/522
(58) Field of Search .................. 428/35.2, 35.5, 428/35.7, 36.9, 192; 383/3, 38, 105, 109, 113, 119; 206/522, 527; 53/403, 472; 602/13; 128/DIG. 20

(56) References Cited

U.S. PATENT DOCUMENTS

| 2,344,369 | 3/1944 | Salfisberg | 229/53 |
| 3,346,101 | 10/1967 | Pestka | 206/46 |
| 4,240,556 | 12/1980 | Field | 206/522 |
| 4,969,312 | * 11/1990 | Pivert et al. | 53/472 |
| 5,272,856 | 12/1993 | Pharo | 53/472 |

FOREIGN PATENT DOCUMENTS

| 1 443 340 | 5/1966 | (FR) . |
| 2 121 977 | 8/1972 | (FR) . |
| 776893 | * 1/1957 | (GB) . |
| 776 893 | 6/1957 | (GB) . |

* cited by examiner

Primary Examiner—Harold Pyon
Assistant Examiner—Alicia Chevalier
(74) Attorney, Agent, or Firm—Young & Thompson

(57) ABSTRACT

Flexible packaging for articles includes an inflatable hollow body in the form of a double-walled tubular formed body in which the article to be packaged is fixed after inflating the hollow body. The hollow body can be shaped as desired by folding and joining techniques to enable both transport packaging for geometrically simply or complexly shaped articles, and also a likewise flexible and effective protective covering of individual hazardous articles.

5 Claims, 2 Drawing Sheets

PACKAGING AND PROCESS FOR ITS PRODUCTION

BACKGROUND OF THE INVENTION

The invention relates to a process for production of packaging for articles with a hollow body.

DESCRIPTION OF THE RELATED ART

Usually the intermediate space between a packaged article and its packaging which usually has a geometrically defined unit shape (prism, cylinder, etc. or combination thereof) is filled to prevent shifting of the article in the packaging and to ensure uniform protection around the article.

Here plastic foams are being used more and more. These plastic foams can be for example foamed saddle bodies as filler or plastic foam moldings which are shaped according to the articles to be packaged, between which the article is held as in a casting mold. The foam moldings either themselves form the entire packaging or are surrounded with an outside shell. This packaging and packaging which uses loose filler material are bulky in storage and disposal and are usually a problem with regard to disposal. Packaging which has air cushions usually consists of composites and are expensive to produce. Furthermore, composites require expensive operating techniques in proper disposal.

FR 1 443 340 A and U.S. Pat. No. 4,240,556 shows packaging with an inflatable hollow body which is a double-walled, tubular formed body. In U.S. Pat. No. 4,240,556 the hollow body which forms the packaging is closed simply on one end by a weld line.

SUMMARY OF THE INVENTION

The object of the invention is to make available packaging which is simple to produce and handle.

With regard to the process, this is done as claimed in the invention by the hollow body being produced from a flat film by double folding in different directions and accordingly airtight sealing on its face edges.

With respect to packaging itself, the object is achieved in packaging for articles comprising an inflatable hollow body which is a double-walled, tubular formed body (U.S. Pat. No. 4,240,556) by the double-walled, tubular formed body being open on its two ends, and by the film which forms the inner layer and the film which forms the outer layer being joined to one another along a seam which runs in the direction of the longitudinal extension of the tubular formed body, i.e. from one terminal opening to the other terminal opening.

With the invention, packaging and a process for production thereof are proposed in which the article to be packaged is held by the packaging having an inflatable hollow body with an inside wall which adjoins the article which has been inserted into the packaging and which is to be packaged during inflation so that the article is fixed and surrounded by an elastic protective zone. The packaging as claimed in the invention requires low material cost. It can be used efficiently both in terms of economics and ecology and by reuse or simple recycling does not permanently burden the environment.

The tightness and resistance of the hollow body provided in the packaging as claimed in the invention is selected depending on the materials used and is matched to requirements. Materials are available which due to their specific properties can be returned after their use in an energy saving manner to granulate form which can in turn represent the initial material (flat film or tubing) for the packaging as claimed in the invention. In the least common cases year-long storability is necessary or there are extreme temperature fluctuations with circumstances which could impose a high demand on the material and the processing technique.

The hollow body used as claimed in the invention for packaging purposes is preferably produced by corresponding folding of a film and tight connection of the edges thereof (existing tubular films can likewise be used). In doing so a hollow cylinder open on both ends is formed. Conventionally this hollow body consists of preferably thermoplastic so that the cut edges can be welded, otherwise cemented, to one another, for which they are preferably overlapped.

The choice of folding technique and the dimensions of the blank of flat film used are decisive for the size of the hollow body produced. The basis for computing the protection zone is the dimensions of the article to be protected and packaged.

Selectively the hollow body of the packaging as claimed in the invention can be formed from a section of endless tubing with edges which are tightly joined to one another. If the endless tubing consists of thermoplastic, the cut edges can be welded to one another, otherwise they are cemented, for which they are preferably overlapped on one another.

Also other pocket-like or bag-like hollow bodies can be produced very easily, for which at least one insertion opening must be present for the article to be packaged; both ends are open in the method of production from endless tubing.

The hollow body can generally form the packaging alone or can be loosely inserted into an especially cylindrical or prismatic protective shell. The inflated hollow body with the inserted article then has a defined, outside geometrical shape so that the articles can be stacked and also the insertion of several hollow bodies into a geometrically defined protective shell (for example, outside carton) is easily possible.

The packaging as claimed in the invention is also an advantageous approach for small sensitive parts. The parts packaged in this way can be transported as bulk material in a protective shell, for example a bag or carton.

Sealing of the hollow bodies after insertion of the article to be packaged and inflation of the hollow bodies takes place in small units, for example by cementing or, with thermoplastics, also by welding. For larger units, especially those which are not intended as disposable packaging, there can be (known) valves.

Hollow bodies which themselves form the packaging, therefore do not bear any protective shell, preferably consist of an elastic or elastoplastic material with reusable, mechanically highly loadable properties, which forms the outside skin film, and a corresponding, more flexible, usually thin-walled inside skin film which are joined to one another by corresponding placement on top of one another in the above described manner. Inflation takes place here preferably via the inside skin film, this in turn consisting preferably of elastic or elastoplastic material, especially a plastic film. By corresponding folding and welding techniques, with the stiff outside skin film geometrical shapes (for example, prisms) can be formed which in turn enable easier stacking of the units packaged in this way. The materials used should be chosen such that they can be supplied as a unit to a recovery system.

BRIEF DESCRIPTION OF THE DRAWINGS

In the following the invention is detailed using embodiments of packaging with reference to the drawing.

FIG. 1a shows how a flat film 1 is folded and on the side opposite the fold is tightly joined on its edges 2 (for example, cementing or welding). The tubing section produced in this way is, as is shown in FIG. 1b, folded once more, on the still open edges 3 in the same process engineering likewise tightly joined and then forms a hollow body 4 which is open to both ends in the form of a tubular formed body.

In this hollow body 4 open on its ends the article to be packaged is inserted and then air is added between the layers of the hollow body 4. In doing so the layers are moved apart and the hollow body thus becomes shorter according to the original tubing width B and for this reason assumes a roughly cylindrical shape (FIG. 2).

Figure 2:
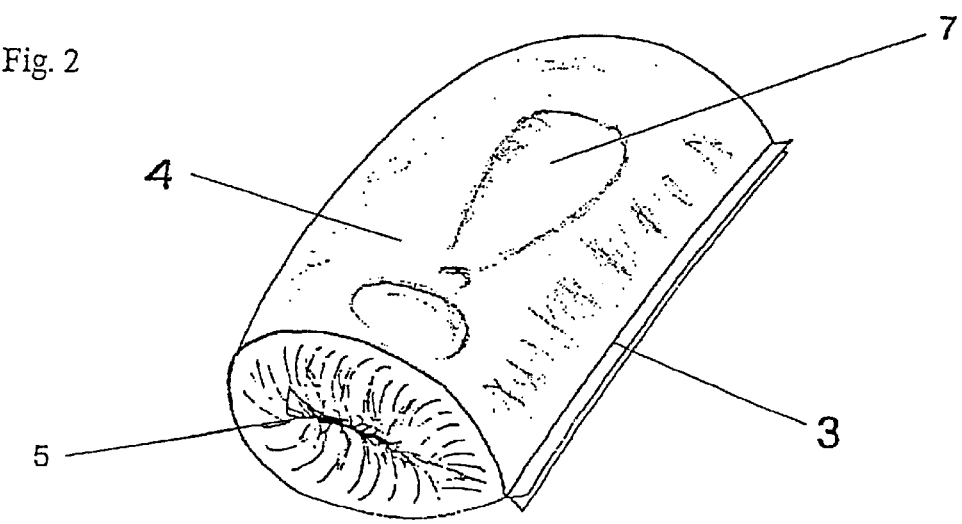
FIG. 2 shows the packaging obtained as shown in FIGS. 1a and b with a drinking glass packaged therein, FIGS. 3a and b show one embodiment of the packaging with reinforced outside skin.

The open ends of the hollow body 4 are thus pulled in the direction towards the central opening 5 and the inside wall arches around the packaged article 7, as can be seen from FIG. 2 using its contour so that the article 7 which is shown as a drinking glass is immovably fixed in the hollow body 4 and is surrounded on all sides by a protective air cushion.

After inflation, the air inflation opening is tightly sealed, for example, cemented. When the hollow body 4 is punctured to remove the packaged article, the air escapes, the packaging collapses and the article 7 can be removed.

The required dimensions of the flat film 1 are determined from the dimensions of the packaged product, and the desired or required protective cushion. (The height and circumference of the packaging plus the air cushion volume are in a direct ratio to the length and width of the flat film).

Figure 1A:
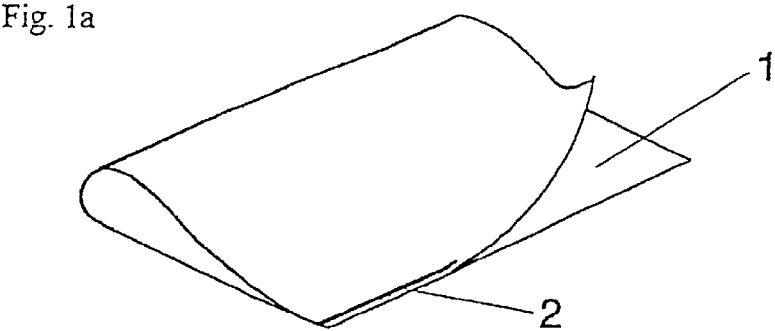
FIGS. 1a and b show two steps in the production of packaging.
Figure 1B:
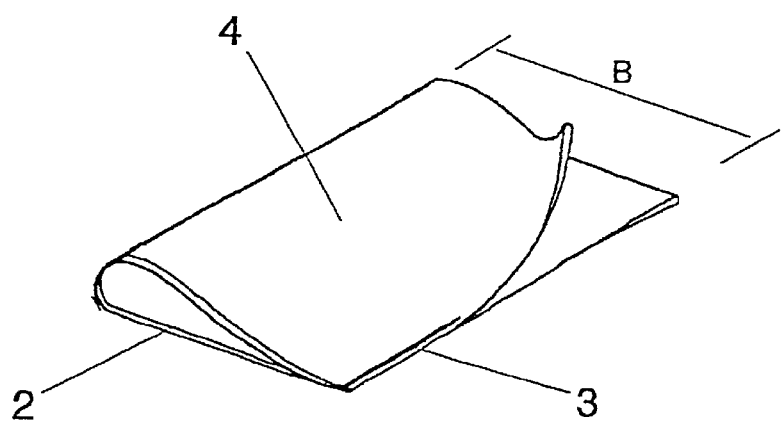

FIG. 2 shows the manufactured hollow body 4 shown in FIGS. 1a and b as a protective jacket for a packaged product (for example, a drinking glass 7) in the inflated state. The inflation pressure depends on the weight of the article to be packaged and the film material used, but is usually low, so that handling of the packaging is completely problem-free. The packaging as claimed in the invention among others yields an outstanding, impact-damped holder of the packaged article.

Figure 3A:
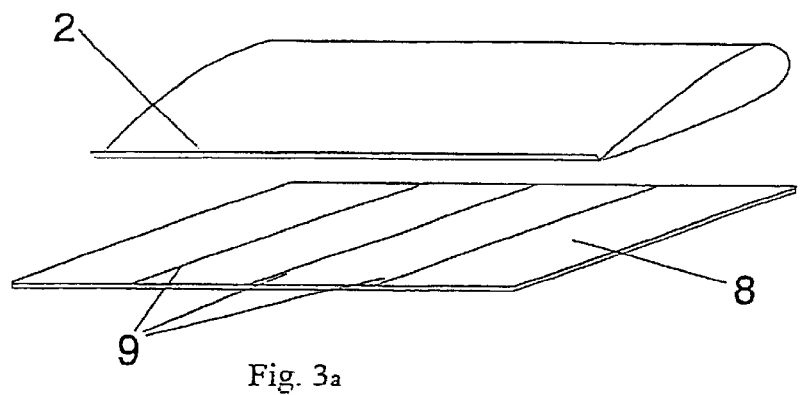
Figure 3B:
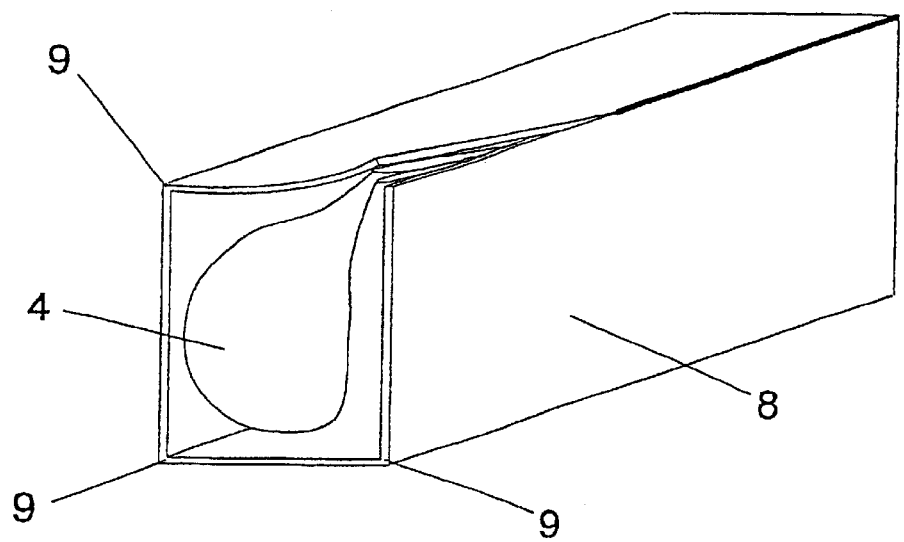

FIGS. 3a and b show one embodiment of packaging which forms the protective shell itself; in this case a mechanically highly loadable material is used as the outer shell 8 such that it is tightly joined (cemented or welded) to the prefabricated tubing section obtained after the stage according to FIG. 1a jointly on the still open edges 3. By the corresponding seams or notches 9 as material pretreatment on the outside shell 8 it is possible to dictate the final geometrical shape of the packaging (for example, shown in FIG. 3b as a prism) optionally and as required.

Figure 4:
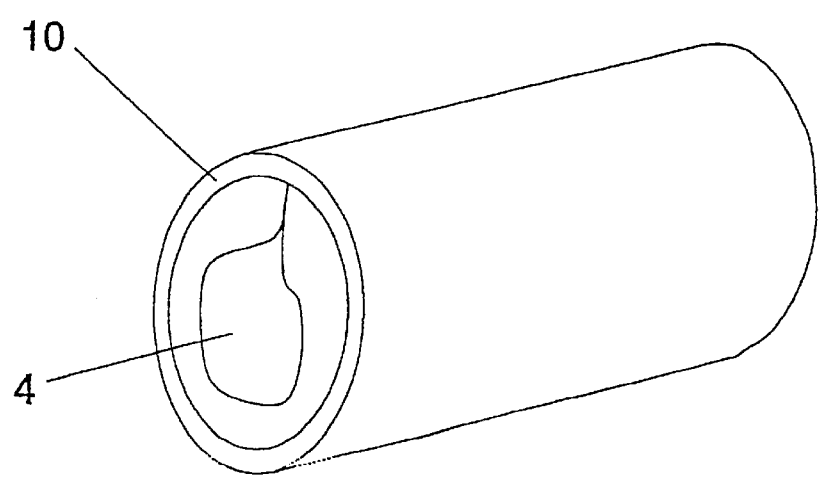
FIG. 4 shows packaging inserted in a shell.

The embodiment shown in FIG. 4 has a protective shell 10 in the form of a (rigid) tube into which the hollow body 4 produced according to FIGS. 1a and b was loosely inserted with its packaging material in order to then form an air-filled protective shell which surrounds the packaging material (see FIG. 2) and still to effectively meet the mechanical actions to the outside caused by the protective shell 10. The protective shell 10 can be closed by a cover (not shown). In this version any geometrical shape which harmonizes with the correspondingly shaped hollow body 4 is conceivable as a protective shell 10.

Of course, the inflatable hollow body 4 can also be formed by cementing, for example a double film, and is not limited to accommodating only one article at a time; several articles, even of different shape, can be held at the same time in this hollow body.

The packaging as claimed in the invention can be used not only as transport packaging, but also for temporary covering of stationary objects to protect or cushion them, so that danger of injury on these articles, for example on their projecting edges or corners, is reduced or prevented.

The packaging can furthermore be colored and/or imprinted in the conventional manner.

In summary, one preferred embodiment of the packaging as claimed in the invention and the process for production thereof can be described as follows:

Flexible packaging for articles is proposed which an inflatable hollow body (4) in the form of a double-walled tubular formed body in which the article (7) to be packaged is fixed after inflating the hollow body (4). The hollow body (4) can be shaped as desired by folding and joining techniques and thus enables not only transport packaging for geometrically simply or complexly shaped articles, but also a likewise flexible and effective protective covering of individual hazardous, for example, stationary articles. The packaging is characterized by ease of handling, space-saving storage before and after use, lightness, and by prevention of composite formation by means of problem-free reusability.

What is claimed is:

1. Inflatable packaging for articles, comprising:
   a film folded on itself to form a top folded edge, an inside layer and an outside layer,
   the folded film including a bottom seamed edge located opposite the top folded edge, and first and second longitudinal edges running from the top folded edge to the bottom seamed edge,
   the first and second longitudinal edges being joined to one another along a longitudinal seam and forming a tubular body, the longitudinal seam running in a longitudinal direction of the formed tubular body,
   the formed tubular body being inflatable by the introduction of air between the inside layer and the outside layer,
   wherein the addition of air between the inside layer and the outside layer forms a double-walled body with two open ends.

2. The inflatable packaging of claim 1, further comprising:
   an outer protective shell joined in an edge region of the outside layer and wrapping around an outside surface of the formed tubular body.

3. The inflatable packaging of claim 1, further comprising an opening arranged on the formed tubular body for the introduction of a pressurized gas.

4. The inflatable packaging of claim 1, further comprising an outer protective shell surrounding an outer surface of the double-walled body.

5. The inflatable packaging of claim 1, further comprising a reinforcement member joined to an outer surface of the double-walled body, the reinforcement member defining an exterior shape of the double-walled body.

* * * * *